United States Patent [19]

Dueker

[11] Patent Number: 4,795,188
[45] Date of Patent: Jan. 3, 1989

[54] ROLL BAR

[76] Inventor: Robert E. Dueker, 6701 Whitaker Ave., Van Nuys, Calif. 91406

[21] Appl. No.: 98,088

[22] Filed: Sep. 18, 1987

[51] Int. Cl.⁴ .............................................. B60R 21/02
[52] U.S. Cl. .................................... 280/756; 403/292
[58] Field of Search ......................... 280/756; 403/292

[56] References Cited

U.S. PATENT DOCUMENTS

| | | | |
|---|---|---|---|
| 3,494,640 | 2/1970 | Coberly et al. | 403/292 |
| 4,068,346 | 1/1978 | Binder | 403/292 |
| 4,148,504 | 4/1979 | Rushing | 280/756 |
| 4,461,509 | 7/1984 | Yaotani et al. | 403/292 |

FOREIGN PATENT DOCUMENTS 479425 11/1969 Switzerland ......................... 280/756

Primary Examiner—Kenneth R. Rice
Attorney, Agent, or Firm—Roger A. Marrs

[57] ABSTRACT

A roll bar is disclosed herein for use as a decorative unit for installation in a truck bed having a pair of substantially U-shaped members composed of tubular stock anchored at their ends to the truck bed arched upwardly with their cross pieces joined together by a pair of clamping elements in spaced-apart relationship. Each member is comprised of several lengths of preformed segments that are joined in end-to-end relationship by inserts coupling adjacent ends together. The inserts may take the form of split cylinders, tapered portions, shaped tube ends, beaded solid plugs and the like. Clamps may be employed where applicable and angled mounting brackets are optional for use where the mounting surface is uneven or irregular.

6 Claims, 2 Drawing Sheets

ROLL BAR

BACKGROUND OF THE INVENTION

1. Field of the Invention

The present invention relates to automotive accessories and more particularly to a novel roll bar for mounting in a truck bed, which is assemblable from a plurality of preformed tubular segments which are joined together by inserts, shaped ends, plugs and the like, and which includes a mounting bracket for attachment to irregular surfaces.

2. Brief Description of the Prior Art

In the past, it has been the conventional practice to construct roll bars for installation in truck beds by fabricating tubular material into a one-piece construction having bends so that the ultimate construction is of a U-shaped member. The free ends of the member are attached by anchoring means to the bed of the truck and support braces of tubular material are then placed against the U-shaped member and the bed of the truck for stabilizing purposes. Generally, the braces and members are welded together. However, problems and difficulties have been encountered when using such conventional fabrication and assembly techniques which stem mainly from the fact that the roll bar is constructed to fit a particular size of truck bed, and once fabricated, cannot be used for other size truck beds. Therefore, such conventional fabrication techniques are not universal and the assembly cannot be arranged to accommodate a variety of truck beds of different sizes and shapes and cannot be installed on uneven or irregular truck bed surfaces. In the latter instance, the braces for the U-shaped member are generally placed on a wheel well and, in many instances, the wheel well offers curved or irregular surfaces to which the end of the braces cannot be attached.

Other problems have resulted from conventional construction due to the fact that exact measurements are required and high tolerances must be maintained. To fabricate properly, exact dimensions must be taken of a particularly truck bed and fabrication of tubular stock must be exact; otherwise, the construction will not fit into the truck bed properly.

Therefore, a long standing need has existed to provide a roll bar construction made from a plurality of tubular segments that may be selectively attached to one another in an end-to-end relationship and which may readily be mounted in a variety of truck beds having different dimensions and anchoring surfaces.

SUMMARY OF THE INVENTION

Accordingly, the above problems and difficulties are obviated by the present invention which provides a novel roll bar construction suitable for installation in a variety of truck beds of different dimensions and size. In one form of the invention, the roll bar construction comprises a pair of substantially U-shaped members composed cf tubular stock material, having their free ends anchored to the floor of a truck bed and to the top of the wheel wells respectively. The cross members or pieces of each U-shaped member are joined together by clamping means so that the assembly is rigidly coupled together at their respective cross pieces and anchored to the truck bed for rigid support. Each member of the pair is composed of several lengths of preformed tubular segments having their respective adjacent ends joined together in an end-to-end relationship by inserts projecting through the open ends of the tubular stock. The inserts may take the form of split cylinders, tapered portions on the end of the segments, shaped tube ends, beaded solid plugs or the like. Clamp means may be included where applicable and angled mounting brackets are employed for mounting on irregular or uneven surfaces.

Therefore, it is among the primary objects of the present invention to provide a novel roll bar assembly composed of a plurality of tubular segments which accommodate a variety of different sized truck beds by the use of inserts for joining or coupling opposing ends of the segments together.

Another object of the present invention is to provide a novel roll bar construction and assembly for truck beds comprising a plurality of tubular segments which are joined together by adjustment inserts so that a variety of different sized truck beds can be accommodated.

Still another object of the present invention is to provide a novel roll bar construction having a major U-shaped member supported by a brace U-shaped member joined at their respective cross pieces by conformal clamping means and wherein each U-shaped member comprises a plurality of tubular segments joined by interconnecting means.

Yet a further object of the present invention is to provide a novel assemblage of tubular segments adapted to accommodate a variety of different sized truck beds so that a roll bar construction is produced from the assemblage of the tubular sections which are joined together by insert means.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
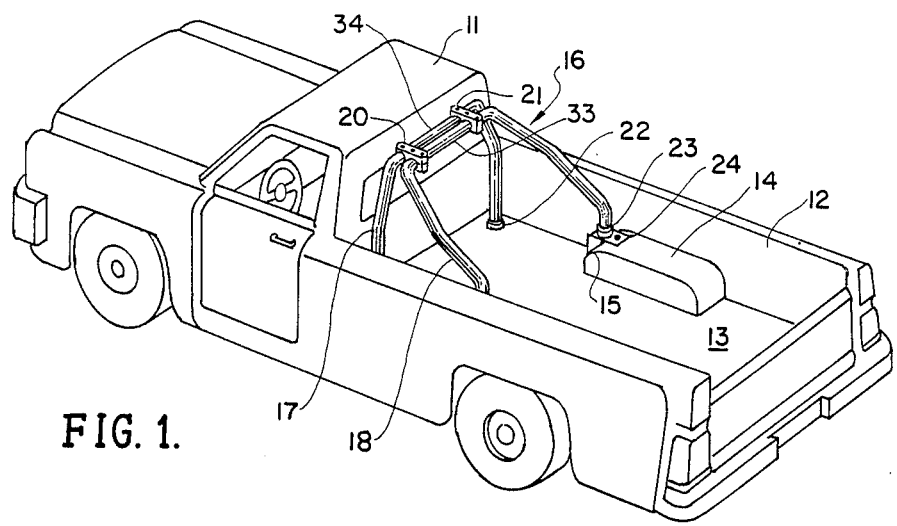
FIG. 1 is a perspective view of a truck incorporating the roll bar construction of the present invention.

Referring to FIG. 1, a conventional pickup truck is indicated by numeral 11, which includes a truck bed 12 having a surrounding sidewall upwardly projecting from a floor 13. As is the usual case, wheel wells, such as well 14, are disposed on the floor 13 and are sometimes of an uneven configuration. As illustrated, the opposite ends of the wheel well 14 are rounded to represent an irregular shape and the rounded end is illustrated by numeral 15.

The roll bar assembly of the present invention is illustrated in the general direction of arrow 16 which includes a first U-shaped member 17 and a U-shaped member 18 forming a brace for the major U-shaped member 17. The respective cross pieces of the members are coupled together by a pair of clamps, indicated by numerals 20 and 21 respectively. The free ends of the respective members are anchored to the truck bed floor 13 and the wheel well 14 respectively by an anchoring means represented by numerals 22 and 23 respectively. In those instances where the wheel well presents a curved or irregular surface, such as at numeral 15, an angle bracket 24 is employed that provides an even and flat surface to which the anchoring means 23 can be fastened.

It is to be particularly noted that the width and depth of the truck bed are well defined and established by the manufacturer of a respective truck type. Therefore, a feature of the inventive roll bar is to accommodate a variety of truck bed widths so that a dealer need not stock multiple sizes or an abnormal quantity of roll bars.

Figure 2:
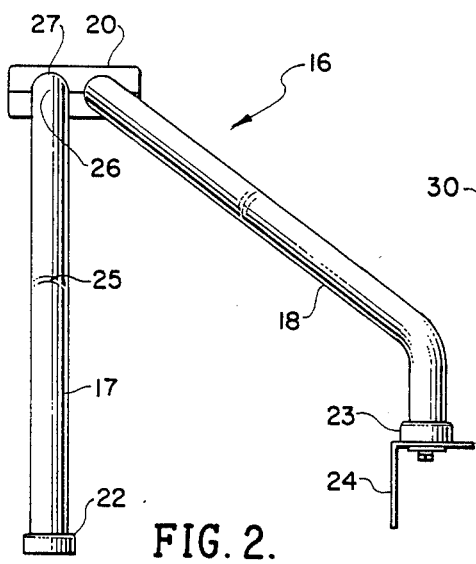
FIG. 2 is an enlarged side elevational view of the roll bar assemblage mounted in the bed of the truck shown in FIG. 1.
Figure 3:
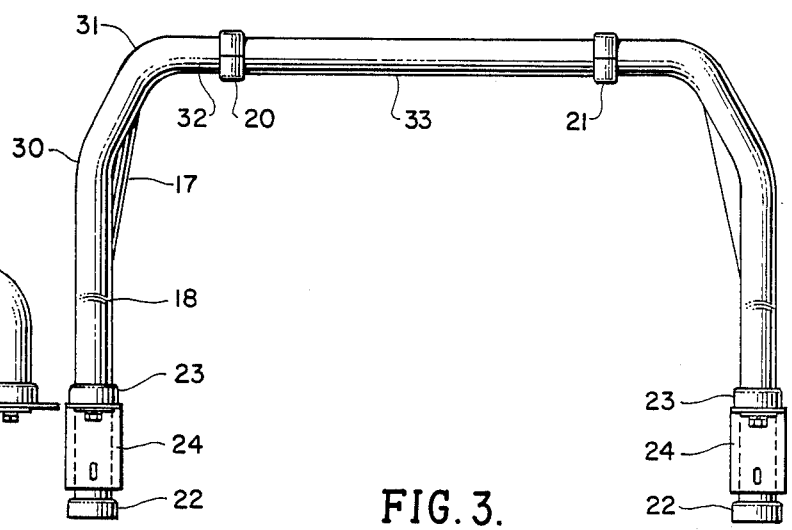
FIG. 3 is a rear elevational view of the roll bar assemblage.

Referring now in detail to FIGS. 2 and 3, the roll bar 16 is more clearly illustrated wherein it can be seen that the major U-shaped member 17 comprises a pair of upright stanchions formed with bends at numerals 25 and 26 to terminate in an end 27, while the brace U-shaped member 18 is formed with bends 30 and 31 to terminate in end 32. A cross piece associated with the U-shaped member 18 is identified by numeral 33, while a cross piece associated with the major U-shaped member 17 is indicated by numeral 34 in FIG. 5. The clamps 20 and 21 are placed over the terminating ends which are adjacent to one another in opposing relationship of the respective tubes 27 and 33. The clamps comprise two elements which are conformal to the pair of cross members about which they are positioned and the two sections are held together by means of conventional fasteners.

Figure 4:
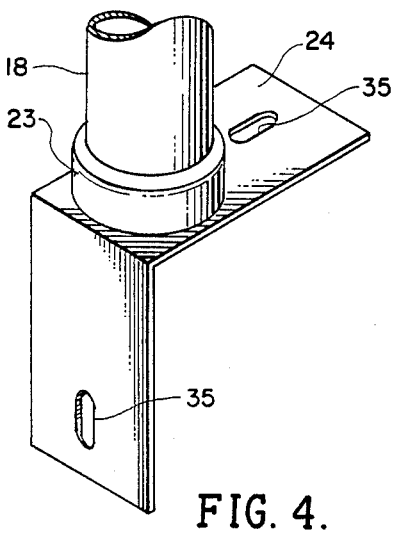
FIG. 4 is a perspective view of the angled mount for supporting the brace of the roll bar on an irregular surface.

Referring now in detail to FIG. 4, it can be seen that the angle bracket 24 includes a pair of flanges which are joined at their adjacent ends to form a 90° angle. Each of the flanges includes mounting holes, such as mounting hole 35, through which bolts or other fasteners may be employed for securing the flange to the flat surfaces of wheel well 14 around the curve 15. The end of brace member 18 is secured to the flat flange of the bracket by the anchoring means 23.

Figure 5:
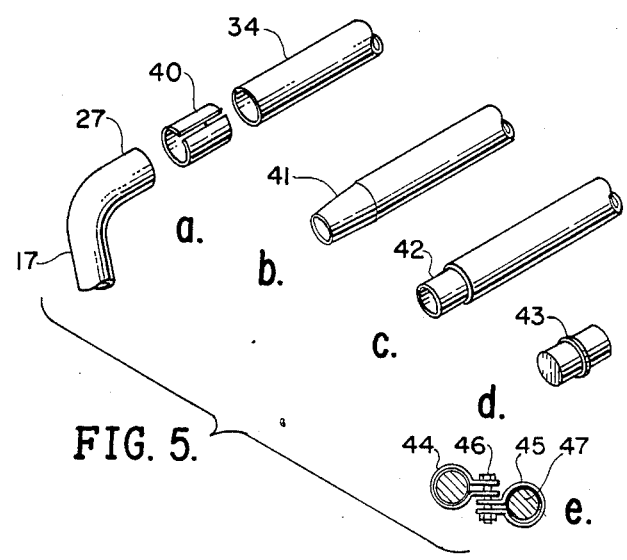
FIG. 5 is a perspective view showing a variety of coupling or insert means for joining opposite ends o tubular segments forming the roll bar construction.

Referring now in detail to FIG. 5, a variety of means are illustrated for interconnecting the adjacent ends of the various segments comprising each of the U-shaped members 17 and 18. For example, the end of tubing 27 is joined with the end of cross member 34 by means of an insert 40 which is represented by a split cylinder. The cylinder may be reduced in diameter so its opposite ends may be forced into the respective openings of the tube segments 34 and 27. When the ends of the segments are in a butting relationship, the insert expands and will maintain the segments not only in butting engagement, but in alignment as well. An alternate means for joining the segments is illustrated in FIG. 5b wherein the end of segment 34 is tapered at 41 so that the taper may be inserted into the end 27 of the tubing 17. Also, a reduced diameter portion 42 may be used, as shown in FIG. 5c, that is inserted into the end 27. Additionally, a solid insert, as shown in FIG. 5d, may be employed wherein a bead 43 separates the abutting ends of the tube end 27 with the tube segment 34. As illustrated in FIG. 5e, a double clamping arrangement can be employed, using clamps 44 and 45, which are joined together by a bolt 46 passing through flanges on each of the clamps and through the space between cross segments 33 and 34. When the clamps are employed, a solid insert is used, joining the adjacent and opposing ends of the respective tubes. A solid insert is indicated by numeral 47.

Figure 6:
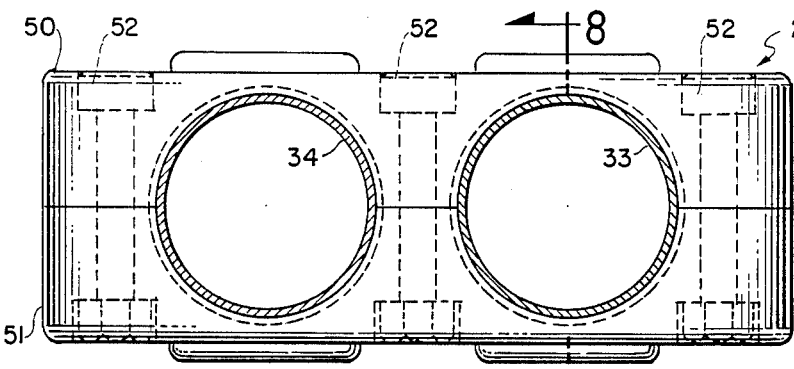
FIG. 6 is a front elevational view of clamping means for joining the cross pieces of the respective U-shaped members of the roll bar construction.
Figure 8:
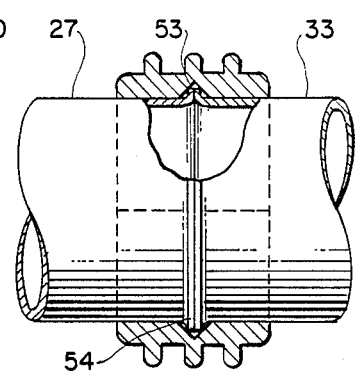
FIG. 8 is a transverse cross-sectional view of the clamping means shown in FIG. 6 as taken in the direction of arrows 8—8 thereof.
Figure 7:
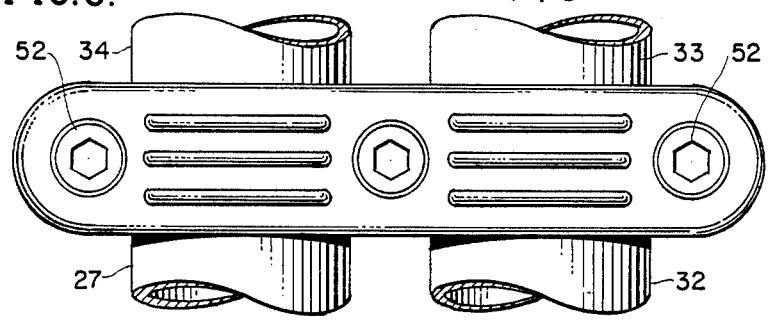
FIG. 7 is a top plan view of the clamping means shown in FIG. 6.

Referring now to FIGS. 6, 7 and 8, a clamping means for joining the cross segments 33 and 34 of the U-shaped members 17 and 18 is illustrated. The clamping means includes an upper and lower segment, indicated respectively by numerals 50 and 51, which are joined together by means of bolts, such as bolt 52. Each segment of the clamping means includes a semicircular shape which, when joined with the shape of its associated segment, defines a circular opening adapted to receive the tubular member. However, it is to be noted, particularly with reference to FIG. 8, that the opening is provided with a groove, indicated by numeral 53, into which the combined flaired ends of tubes are inserted. For example, the opposing ends of tubes 27 and 33 are flaired, as indicated by numeral 54, and joined together within the circular groove 53 so that when the bolts 52 are cinched or tightened, the tube ends are rigidly secured together. Also, the bolts are countersunk or placed through recesses so that the head and nuts of the bolts are substantially hidden or recessed. It is to be understood that the use of the flanges at the end of the tubes is an alternate method of construction and assembly from the use of the inserts as shown in FIG. 5. However, if desired, the inserts can also be used in addition to the flaired ends of the tubing if such a construction is deemed necessary by the user.

Figure 9:
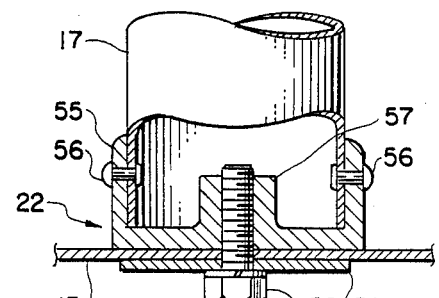
FIG. 9 is a sectional view of an anchoring means for joining a tubular member to the truck bed.

Referring now in detail to FIG. 9, an anchoring means is illustrated for a member stanchion such as stanchion 17, which is intended to be attached to the truck bed 13. The end of the tubing is provided with a circular cup 55 into which the tube end is placed and is retained therein by fasteners such as rivets 56. The center of the cup is reinforced by a thickened portion 57 into which a threaded bore is placed for receiving a bolt fastener 58. A washer 59 completes the anchor assembly.

Figure 10:
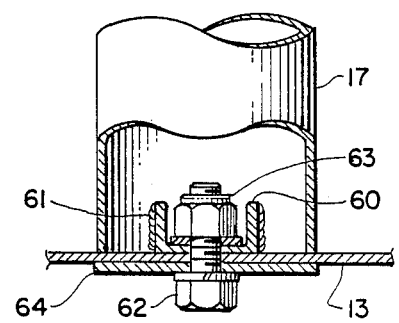
FIG. 10 is a cross-sectional view of another means of joining a tubular member to the truck bed.

An alternate to the anchoring means shown in FIG. 9 is the anchoring means shown in FIG. 10 wherein the interior of the tube 17 is fitted with a channel piece 60 wherein the opposite ends of the channel are welded such as by weldment 61 to the inside surface of the tube end, and wherein a bore is placed in the center of the channel 60 through which a bolt 62 passes. A nut and washer arrangement 63 completes the fastening assembly, along with a washer 64, so that the tube ending is terminated in a secure anchor with the truck bed floor 13.

Figure 11:
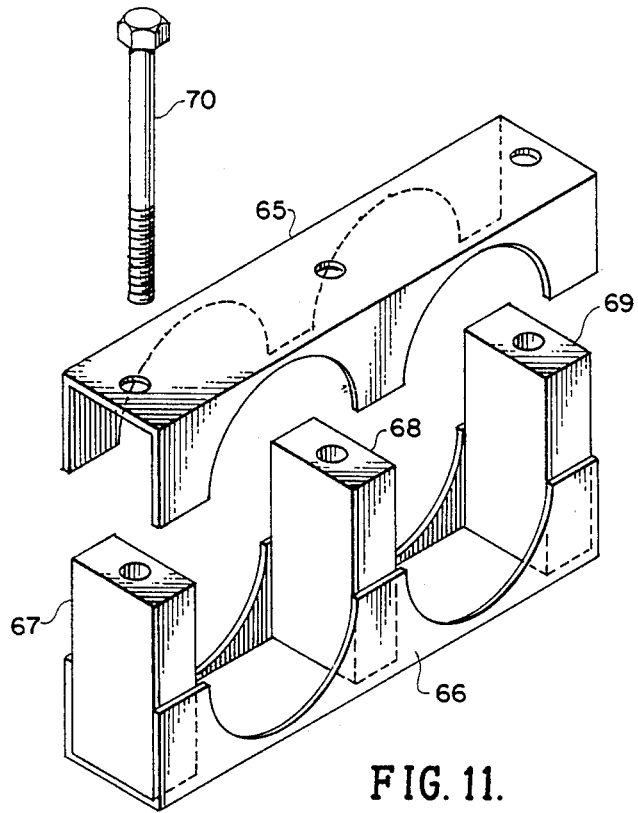
FIG. 11 is a perspective view of another clamping means used for coupling the cross pieces of the U-shaped members together.

Referring now to FIG. 11, an alternate clamping means is illustrated wherein a pair of sheet metal sections 65 and 66 are employed, having conformal semicircular portions provided in each side of the section. The sections are intended to embrace and join the opposing ends of the respective tube from the stanchions and cross members of the respective U-shaped members, as previously described. Spacers 67, 68 and 69 are intended to be disposed on opposite sides of the respective tubings and are intended to pass the fasteners therethrough for joining the sections 65 and 66 together. The spacers also provide for load carrying capacity and a typical fastener is illustrated by numeral 70.

Therefore, it can be seen that the novel roll bar of the present invention provides a major roll bar taking the form of the U-shaped member 17 and the brace bar taking the form of the U-shaped member 18. The cross members of the respective bars are joined together by a clamping means which may be either of the versions shown in FIG. 6 or the version shown in FIG. 11. The adjacent and opposing ends of the tubular segments forming the U-shaped members can be flaired, as shown in FIG. 8 for coupling by means of the sections shown in FIG. 6, or any one of a plurality of inserts may be provided for interconnection purposes, as shown and described with respect to FIG. 5. The ends of the stanchions of the main or major U-shaped member are anchored to the truck bed floor by either the anchoring means shown in FIG. 9 or the means shown in FIG. 10. The anchoring means for the end of the brace member 17 can be directly coupled to the wheel well 14 if a smooth and flat surface is available by using the anchoring means of either FIGS. 9 or 10. However, should an uneven or irregular surface be available, such as the curve 15 on the wheel well 14, then the angle bracket 24 may be employed and the stanchion anchoring means directly attached thereto.

In view of the foregoing, it can be seen that the roll bar of the present invention provides a novel means for adjusting to a plurality of dimensional distinctions characteristic of truck beds.

Installation time is greatly reduced since no mounting plates are required by conventional roll bar units and the number of holes needed for installation is reduced. Therefore, less installation space is needed and no loss of holding power is experienced. A typical material used is 304 polished stainless steel so as to prevent or lessen corrosion. Also, the need for and the amount of welding employed is substantially reduced by the present inventive concept.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An ornamental roll bar for installation across the width of a truck bed comprising the combination of:
   first and second U-shaped members composed of tubular stock having a smooth and continuous surface with their respective free ends anchored to the floor of the truck bed;
   each member is arched upwardly having respective cross pieces joined together by clamping elements in fixed spaced-apart relationship;
   each member comprising several lengths of preformed segments having their opposing ends joined together in an end-to-end relationship;
   insert means cooperatively coupling said segment opposing ends together to provide a unitary member composed of said segments;
   said first U-shaped member is in a vertical upright orientation with respect to said truck bed floor;
   said second U-shaped member is a brace for said first member having its free ends non-movably anchored to said truck bed floor a substantial distance behind said free ends of said first member in fixed spaced-apart relationship;
   said clamping elements comprise a pair of spaced-apart clamps overlapping abutting joined ends of associated segments joining both first and second members together in a fixed, non-movable relationship;
   each clamping element includes a pair of clamp yokes having semicircular openings forming a pair of circular openings when joined together about said cross pieces of said first and said second members; and
   a cup having a circular socket for receiving said free ends of said members respectively and having a reinforced center in each cup socket for receiving a fastening means securing said free end to said truck bed floor.

2. The invention as defined in claim 1 including:
   a right-angled plate carried on said free ends of said second U-shaped means for mounting onto irregular surfaces.

3. The invention as defined in claim 1 wherein:
   said insert means is a rod having a raised bead carried about its midsection;
   opposite ends of said insert rod insertably received into open tubular ends of opposing segment ends;
   said segment ends separated by said raised rod bead.

4. The invention as defined in claim 1 wherein:
   said insert means is a split cylinder having its opposite forcibly urged into opposing tubular ends of said segments.

5. The invention as defined in claim 1 wherein:
   said insert means includes a selected one of said segment ends being tapered so as to be insertably received into the tubular opening of said opposite segment end.

6. The invention as defined in claim 1 wherein:
   said insert means includes a reduced diameter end of a selected one of said segments for insertion into an opposing end of an associated segment.

* * * * *